(12) United States Patent
Luong et al.

(10) Patent No.: US 7,323,222 B2
(45) Date of Patent: Jan. 29, 2008

(54) ANAEROBIC ADHESIVE COMPOSITIONS CURABLE ON INACTIVE SURFACES

(75) Inventors: Dzu Dinh Luong, West Hartford, CT (US); Frederick F. Newberth, III, West Hartford, CT (US); Canh Minh Tran, West Hartford, CT (US); Richard D. Rich, Avon, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 10/473,201

(22) PCT Filed: Nov. 18, 2002

(86) PCT No.: PCT/US02/36873

§ 371 (c)(1),
(2), (4) Date: Sep. 29, 2003

(87) PCT Pub. No.: WO03/044068

PCT Pub. Date: May 30, 2003

(65) Prior Publication Data

US 2004/0112507 A1    Jun. 17, 2004

(51) Int. Cl.
*B05D 3/00* (2006.01)

(52) U.S. Cl. .............. 427/385.5; 427/388.1; 427/393.5; 427/393.6

(58) Field of Classification Search ............ 427/388.1, 427/393.5
See application file for complete search history.

(56) References Cited

U.S. PATENT DOCUMENTS

| | | | | |
|---|---|---|---|---|
| 2,895,950 A | * | 7/1959 | Krieble ............... | 526/323.1 |
| 3,043,820 A | * | 7/1962 | Krieble ............... | 526/320 |
| 3,218,305 A | * | 11/1965 | Krieble ............... | 526/320 |
| 3,988,299 A | * | 10/1976 | Malofsky ............. | 526/259 |
| 4,533,446 A | * | 8/1985 | Conway et al. ...... | 156/273.3 |
| 4,731,146 A | | 3/1988 | Clark .................. | 156/314 |
| 4,916,184 A | * | 4/1990 | Clark .................. | 525/27 |
| 5,021,487 A | * | 6/1991 | Klemarczyk ........ | 524/104 |
| 5,318,850 A | * | 6/1994 | Pickett et al. ....... | 428/412 |
| 5,506,007 A | * | 4/1996 | Williams et al. .... | 427/495 |
| 5,567,788 A | * | 10/1996 | Zezza ................. | 526/334 |
| 5,747,115 A | * | 5/1998 | Howell et al. ....... | 427/514 |
| 6,048,911 A | * | 4/2000 | Shustack et al. .... | 522/96 |
| 6,460,464 B1 | * | 10/2002 | Attarwala ........... | 102/469 |
| 6,624,273 B1 | * | 9/2003 | Everaerts et al. ... | 526/317.1 |

FOREIGN PATENT DOCUMENTS

| | | |
|---|---|---|
| CA | 2137759 | 6/1995 |
| EP | 0 250 090 A2 | 12/1987 |
| EP | 0 522 790 A1 | 1/1993 |
| EP | 0 538 866 A1 | 4/1993 |
| EP | 0 618 244 A2 | 10/1994 |
| GB | 2179955 * | 3/1987 |
| JP | 08027236 | 1/1996 |

OTHER PUBLICATIONS

Christmas, RADCURE '84, Conf. Proc., 1/21-1/38, 1994.*

* cited by examiner

*Primary Examiner*—Erma Cameron
(74) *Attorney, Agent, or Firm*—Steven C. Bauman

(57) ABSTRACT

The present invention relates to anaerobically curable compositions, methods of preparation and methods of use that provide enhanced physical properties when cured in contact with untreated inactive surfaces. The compositions which include isobornyl acrylate, isobornyl methacrylate or combinations thereof in combination with a multi(meth)acrylate and a free-radical initiator, may be used without the addition of a transition metal catalyst.

11 Claims, No Drawings

ANAEROBIC ADHESIVE COMPOSITIONS CURABLE ON INACTIVE SURFACES

BACKGROUND OF INVENTION

1. Field of the Invention

The present invention relates to anaerobically curable compositions that provide enhanced properties when cured on an inactive surface. The compositions cure on inactive surfaces without the use of a primer and without the addition of a transitional metal catalyst.

2. Brief Description of the Related Technology

Anaerobic adhesive compositions are well known for their ability to remain in a liquid, unpolymerized state in the presence of oxygen and to cure to a solid state upon the exclusion of oxygen. Early work on anaerobic adhesive compositions concentrated on developing a cure system which improved the speed and/or bond strength of the adhesive composition. Various cure systems for anaerobic adhesive compositions have been developed to primarily focus on efficiently performing the redox reaction, which is the basis for anaerobic chemistry. Hydroperoxides were found to serve as a catalyst for the generation of a free radical.

Anaerobic compositions generally contain (meth)acrylic functional monomers, an organic hydroperoxy or perester initiator, accelerators such as saccharin and/or dimethyl-p-toluidene, and stabilizers such as hydroquinone or other phenolic stabilizers and metal chelators such as sodium EDTA. Those persons of ordinary skill in the art acknowledge that peroxides serve as a free radical generating source which initiate free radical curing of the polymerizable anaerobic adhesive monomer compositions. To increase the speed at which the free radical is generated, accelerators are employed in combination with the peroxides to enhance the speed at which the peroxide free radical is generated. In so doing, the cure speed of the anaerobic adhesive composition is increased. Speed of cure and strength are two desirable properties of anaerobic sealants that increase their usefulness for impregnation of porous materials and threadlocking.

Substrates such as stainless steel, zinc, dichromate, cadmium and plastic are inactive porous materials that are relatively slow to cure compared to active metals such as iron and copper. Therefore, many anaerobic adhesive compositions have conventionally employed primer compositions to speed their cure and/or the addition of a transition metal, generally in the form of a salt. For inactive surfaces, primer compositions have been considered necessary for the quick fixture and cure times required of many applications.

The use of primer compositions requires an additional step prior to applying the anaerobic adhesive composition, which is often inconvenient and costly. Often the solvent used to carry the accelerator component in the primer is environmentally harmful and requires special handling and disposal. Moreover, the user must ordinarily wait until the solvent has evaporated before applying the adhesive. For example, U.S. Pat. No. 4,731,146 to Clark discloses a primer/activator composition that requires the use of a volatile organic solvent to carry the cure activator which must evaporate before the anaerobically curable composition may be introduced to the substrate.

Limiting the number of components required to provide an anaerobically curable composition promotes efficiency of manufacturing and reduction of cost. A further advantage would be to provide an anaerobically curable composition with enhanced properties such as speed of cure and strength of cure without the need for a primer or the addition of a transitional metal. Therefore, there is a need for an anaerobically curable composition that provides enhanced cure properties with a limited number of components required in manufacture that does not require the additional step of preparing the substrate with a primer and may be used without the addition of a transitional metal.

SUMMARY OF THE INVENTION

One aspect of the present invention provides an anaerobically curable composition which provides enhanced physical properties when cured in the presence of an untreated inactive surface and without the addition of transition metal catalysts. The composition includes a free radical initiator and two different (meth)acrylates; a mono(meth)acrylate that includes isobornyl acrylate, isobornyl methacrylate, or combinations thereof and a multi(meth)acrylate.

Another aspect of the present invention provides an anaerobically curable composition which provides enhanced physical properties when cured in the presence of an untreated inactive surface and without the addition of transition metal catalysts that is the reaction product of a free radical initiator and two different (meth)acrylates; a mono (meth)acrylate that includes isobornyl acrylate, isobornyl methacrylate, or combinations thereof and a multi(meth)acrylate.

A further aspect of the present invention provides a method for preparing an anaerobically curable composition which provides enhanced physical properties when cured in the presence of an untreated inactive surface and without the addition of transition metal catalysts. The method includes combining a free radical initiator and two different (meth)acrylates; a mono(meth)acrylate that includes isobornyl acrylate, isobornyl methacrylate, or combinations thereof and a multi(meth)acrylate.

A still further aspect of the present invention provides a method of impregnating a porous inactive surface with an anaerobic sealant that includes first preparing a composition that includes a free radical initiator and two different (meth) acrylates; a mono(meth)acrylate that includes isobornyl acrylate, isobornyl methacrylate, or combinations thereof and the second is a multi(meth)acrylate. The porous inactive surface is then impregnated with the composition and allowed to cure.

The anaerobically curable compositions may be used in a variety of applications such as threadlocking and impregnation compositions.

DETAILED DESCRIPTION OF THE INVENTION

The anaerobically curable compositions of the present invention provided improved cure properties when cured on an untreated inactive surface. The compositions may be used without the addition of a transition metal catalyst and without the additional step of first priming or treating the surface which has the disadvantages of added cost and time.

As used herein, the term "(meth)acrylate" or "(meth) acrylic" refers to acrylate and/or methacrylate species. The term "mono(meth)acrylate" refers to the presence of a single (meth)acrylate group, while the term "multi(meth)acrylate" refers to more than one (meth)acrylate group.

The compositions of the present invention include isobornyl acrylate, or isobornyl methacrylate, or combinations thereof, in combination with a multi(meth)acrylate and a free radical initiator. The anaerobic compositions may be used with a variety of inactive surfaces that include but are not limited to stainless steel, zinc, plastic, and cadmium.

The isobornyl acrylate or isobornyl methacrylate may be used in the largest weight percentage compared to the other components. The composition may include between about 30% to about 90% of the isobornyl acrylate or methacrylate by weight of the composition, desirably from about 60% to about 80% by weight of the composition.

The multi(meth)acrylate is a polymerizable crosslinkable component which may be used in a smaller percentage; from about 10% to about 70% by weight of the composition. Particularly useful multi(meth)acrylates include ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopertyl glycoldiacrylate, pentaerythritol tetraacrylate, 1,2-butylene glycoldiacrylate, trimethylolpropane ethoxylate trimethacrylate, glyceryl propoxylate trimethacrylate, trimethylolpropane trimethacrylate, dipentaerythritol monohydroxy pentamethacrylate, tri(propylene glycol) dimethacrylate, neopentylglycol propoxylate dimethacrylate, 1,4-butanediol dimethacrylate, polyethyleneglycol dimethacrylate, triethylene glycol dimethacrylate, butylene glycol di(meth)acrylate, ethoxylated bisphenol A dimethacrylate and combinations thereof.

Other (meth)acrylates useful in the present invention include those which conform to the structure:

$$H_2C=CGCO_2R$$

wherein G may be hydrogen, halogen or alkyl of 1 to about 4 carbon atoms, and R may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

Examples of polar group functionalized mono(meth)acrylates include cyclohexylmethacrylate, hydroxyethyl acrylate, hydroxypropyl methacrylate, t-butylaminoethyl methacrylate, cyanoethylacrylate, and chloroethylmethacrylate. Other common monofunctional esters include alkyl esters such as lauryl methacrylate. Many lower molecular weight alkyl esters exhibit volatility, and frequently it may be more desirable to use a higher molecular weight homologue, such as decyl methacrylate or dodecyl methacrylate, or any other fatty acid acrylate esters, in (meth)acrylate-based impregnant compositions.

Hydroxyalkyl (meth)acrylates are also useful. The alkyl portion may be selected from numerous linear, branched or cyclic groups, e.g., having 1-20 carbon groups, which may also include various substitutions.

Desirably at least a portion of the (meth)acrylic monomer comprises a di- or other multi(meth)acrylate ester. These multifunctional monomers produce cross-linked polymers, which serve as more effective and more durable sealants. Various (meth)acrylate monomers may be used, such as those multi(meth)acrylate esters which have the following general formula:

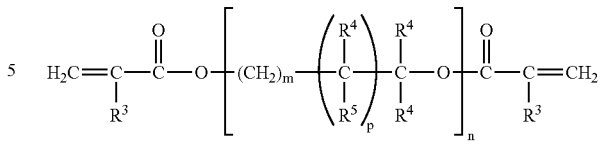

wherein $R^4$ represents a radical selected from the group consisting of hydrogen, lower alkyl of from 1 to about 4 carbon atoms, hydroxyalkyl of from 1 to about 4 carbon atoms, and

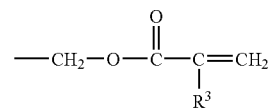

$R^3$ is a radical selected from the group consisting of hydrogen, halogen, and lower alkyl of from 1 to about 4 carbon atoms; $R^5$ is a radical selected from hydrogen, hydroxyl, and

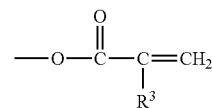

m may be 0 to 12, preferably from 0 to about 6; n is at least 1 (e.g., 1 to about 20 or more, preferably between about 2 to about 6); and p is 0 or 1.

Examples of these polymerizable multi(meth)acrylate esters include, but are not limited to, di-, tri- and tetraethyleneglycol dimethacrylate, dipropyleneglycol; dimethacrylate; polyethyleneglycol dimethylacrylate; di(pentamethyleneglycol) dimethacrylate; tetraethyleneglycol diacrylate; tetra-ethyleneglycol di(chloracrylate); diglycerol diacrylate; diglycerol tetramethacrylate; tetramethylene dimethacrylate; ethylene dimethacrylate; and neopentylglycol diacrylate. Others include, triethyleneglycol dimethacrylate, butyleneglycol dimethacrylate, bis(methacryloxyethyl) phosphate, 1,4 butane diol di(meth)acrylate and trimethylol propane dimethacrylate.

A peroxide may be used as the free radical initiator of the composition. A number of well known initiators of free radical polymerization may be incorporated in the present invention. Among those included are, without limitation, hydroperoxides, such as cumene hydroperoxide (CHP), paramenthane hydroperoxide, tertiary butyl hydroperoxide (TBH) and tertiary butyl perbenzoate. Useful amounts of peroxide compounds typically range from about 0.1 to about 10% by weight of the total composition. A reducing agent, such as saccharin may also be included.

While the compositions are anaerobically curable, meaning in the substantial absence of oxygen, they are also optionally heat curable. For this reason a heat curing catalyst may also be employed.

Stabilizers and inhibitors may also be employed as well as chelating agents to control and prevent premature peroxide decomposition and polymerization. Among those useful inhibitors include phenols such as hydroquinone and quinones. Chelating agents may be used to remove trace amounts of metal contaminants. An example of a useful chelating agent is the tetrasodium salt of ethylenediamine tetraacetic acid (EDTA).

Other agents such as thickeners, plasticizers, fillers, elastomers, thermoplastics, and other well-known additives may be incorporated where functionally desirable.

The method of preparing the anaerobically curable compositions include combining the mono(meth)acrylate which includes isobornyl acrylate, isobornyl methacrylate or combinations thereof, and the multi(meth)acrylate with a free-radical initiator and optionally including other (meth)acrylates, as described above. Other components may also be included such as free-radical initiators, heat cure catalysts, thickeners, plasticizers, fillers, elastomers, thermoplastics, etc.

The anaerobically curable compositions may be used to impregnate porous inactive surfaces by any conventional impregnation means such as wet vacuum impregnation, wet vacuum/pressure impregnation, or dry vacuum/pressure impregnation. The impregnate is then allowed to cure in the surface either at room temperature or heated.

The anaerobically curable compositions are also useful as threadlockers, i.e. to secure a nut to a bolt. This is achieved by applying the composition to the threads of a bolt, mating it with a nut and allowing it to cure.

The features and advantages of the present invention are more fully shown by the following examples which are provided for purposes of illustration, and are not to be construed as limiting the invention in any way.

EXAMPLE

Anaerobically curable threadlocking compositions corresponding to the present invention were prepared. Comparative Composition A was prepared using Threadlocker 246 available from Loctite Corporation, Rocky Hill, Conn. Inventive Compositions B and C were prepared using approximately the amounts described in Table I.

TABLE I

| Component | Composition by % Weight | | |
|---|---|---|---|
| | A* | B | C |
| Methacrylate resin (non isobornyl) | 40-45 | | |
| Polymeric Plasticizer | 20-25 | | |
| Hydroxyalkyl methacrylate | 10-15 | | |
| Maleimide resin | 10-15 | | |
| Aromatic dimethacrylate ester | 5-10 | | |
| Fumed silica | 3-5 | | |

TABLE I-continued

| Component | Composition by % Weight | | |
|---|---|---|---|
| | A* | B | C |
| Cumene Hydroperoxide | 1-3 | | |
| Poly(ethylene) | 1-3 | | |
| Poly(tetrafluoroethylene) | 1-3 | | |
| Saccharin | 1-3 | | |
| 1-Acetyl-2-phenylhydrazine | 0.1-1 | | |
| N,N-Dialkyltoliudines | 0.1-1 | | |
| Maleic Acid | 0.1-1 | | |
| Isobornyl Acrylate | | 80 | 0 |
| Isobornyl Methacrylate | | 0 | 80 |
| Ethoxylated 2 bisphenol A Diacrylate | | 15 | 15 |
| Anaerobic cure inducing composition** | | 5 | 5 |
| Total | 100 | 100 | 100 |

*information from MSDS for Loctite ® 246 Threadlocker
**composition contains at least one peroxide and saccharin The compositions were applied in equal amounts to the threads of bolts and mated with nuts using a pretorque of 5 newton-meters (Nm) (about 44 in-lbs.). The compositions were allowed to cure for 24 hours at room temperature. The percent of ultimate strength was also calculated.

The compositions were tested for their cure speed as measured by the threadlocking strength (breakloose/prevail [in-lbs.]) developed on various inactive substrates (nuts and bolts), as well as on degreased steel and reoiled steel as a comparison, at room temperature for a given cure time. A relatively high breakloose torque is preferred as this is the force required to initially move the nut. A relatively lower prevail strength is desired to provide ease of disassembly.

The results of these tests are shown below in Table II.

TABLE II

| Composition | Cure Strength (breakloose/prevail [in.-lbs.]) | | | | % Ultimate Strength | | | |
|---|---|---|---|---|---|---|---|---|
| | Degreased | Reoiled | Stainless | Zinc | Degreased | Reoiled | Stainless | Zinc |
| A | 237/281 | 247/326 | 141/228 | 180/27 | 100 | 104 | 59 | 76 |
| B | 194/171 | 239/213 | 217/137 | 160/182 | 100 | 123 | 112 | 82 |
| C | 303/166 | 317/191 | 278/223 | 240/172 | 100 | 105 | 92 | 79 |

Degreased - Degreased Steel
Reoiled - Reoiled Steel
Stainless - Stainless Steel

As indicated in the results in Table II, the inventive compositions B and C show significant improvement with speed of cure and strength of cure on the inactive surfaces. With respect to Composition B, the % Ultimate Strength is particularly noteworthy. When Composition B was applied to both the Stainless and the Zinc the composition demonstrated a higher % Ultimate cure than both Comparative Composition A and Inventive Composition C. Composition C also showed advantages with respect to the difference between breakloose and prevail strengths where the breakloose strength was advantageously greater than the prevail strength.

What is claimed is:

1. An anaerobically curable composition which cures in contact with an untreated inactive surface consisting essentially of a mono(meth)acrylate selected from the group consisting of isobornyl acrylate, isobornyl methacrylate, and combinations thereof, a multi(meth)acrylate, a reducing agent, and a free radical initiator.

2. The composition of claim 1 wherein said multi(meth)acrylate is a member selected from the group consisting of ethoxylated bisphenol A dimethacrylate, polyethylene glycol dimethacrylate, triethylene glycol dimethacrylate, and combinations thereof.

3. The composition of claim 1 wherein said mono(meth)acrylate comprises from about 50% to about 90% by weight of said composition.

4. The composition of claim 1 wherein said inactive surface is a member selected from the group consisting of stainless steel, zinc, plastic, and cadmium.

5. The reaction product of a composition of claim 1.

6. A method of preparing an anaerobically curable composition which cures in contact with an untreated inactive surface consisting essentially of combining a reducing agent, a free radical initiator, a mono(meth)acrylate selected from the group consisting of isobornyl acrylate, isobornyl methacrylate, and combinations thereof, and multi(meth)acrylate.

7. The method of claim 6 wherein said multi(meth)acrylate is a member selected from the group consisting of ethoxylated bisphenol A dimethacrylate, polyethylene glycol dimethacrylate, triethylene glycol dimethacrylate, and combinations thereof.

8. A method of impregnating a porous inactive surface with an anaerobic sealant comprising the following steps:
   a) providing a porous inactive surface;
   b) impregnating said porous inactive surface with a composition consisting essentially of a reducing agent, a free radical initiator, a mono(meth)acrylate selected from the group consisting of isobornyl acrylate, isobornyl methacrylate, and combinations thereof, and a multi(meth)acrylate; and
   c) allowing said composition to cure within said porous inactive surface.

9. The method of claim 8 wherein said multi(meth)acrylate is selected from the group consisting of ethoxylated bisphenol A dimethacrylate, polyethylene glycol dimethacrylate, and triethylene glycol dimethacrylate.

10. An anaerobically curable impregnation composition which cures in contact with an untreated inactive surface consisting essentially of a reducing agent, a free radical initiator, a mono(meth)acrylate selected from the group consisting of isobornyl acrylate, isobornyl methacrylate, and combinations thereof, and a multi(meth)acrylate selected from the group consisting of ethoxylated bisphenol A dimethacrylate, polyethylene glycol dimethacrylate, triethylene glycol dimethacrylate, and combinations thereof.

11. An anaerobically curable composition which cures in contact with an untreated inactive surface consisting essentially of (i) a mono(meth)acrylate selected from the group consisting of isobornyl acrylate, isobornyl methacrylate, and combinations thereof, (ii) a multi(meth)acrylate, (iii) a free radical initiator, (iv) a reducing agent, and (v) one or more additional components selected from the group consisting of thickeners, plasticizers, fillers, elastomers, and thermoplastics.

* * * * *